(12) United States Patent
Hammer et al.

(10) Patent No.: US 10,654,136 B2
(45) Date of Patent: May 19, 2020

(54) COMPONENT CONNECTION AND METHOD FOR PRODUCING A COMPONENT CONNECTION

(71) Applicant: Bayerische Motoren Werke Aktiengesellschaft, Munich (DE)

(72) Inventors: Maik Hammer, Bruckberg (DE); Johann Van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 902 days.

(21) Appl. No.: 15/191,949

(22) Filed: Jun. 24, 2016

(65) Prior Publication Data

US 2016/0303691 A1 Oct. 20, 2016

Related U.S. Application Data

(63) Continuation of application No. PCT/EP2015/053595, filed on Feb. 20, 2015.

(30) Foreign Application Priority Data

Mar. 26, 2014 (DE) .................. 10 2014 205 609

(51) Int. Cl.
*B23K 37/04* (2006.01)
*B23K 26/324* (2014.01)
(Continued)

(52) U.S. Cl.
CPC .......... *B23K 37/04* (2013.01); *B23K 26/0884* (2013.01); *B23K 26/22* (2013.01);
(Continued)

(58) Field of Classification Search
CPC ........ F16B 5/0642; F16B 5/0664; F16B 5/08; F16B 2001/0035; B23K 2101/006;
(Continued)

(56) References Cited

U.S. PATENT DOCUMENTS 4,128,449 A 12/1978 Kobetsky
4,637,116 A * 1/1987 Parisch ...................... B60J 7/02
228/115

(Continued)

FOREIGN PATENT DOCUMENTS

CN 102606953 A 7/2012
CN 103124670 A 5/2013
(Continued)

OTHER PUBLICATIONS

German Commercial Register issued in Counterpart German Application No. 10 2014 205 609.8 dated Apr. 26, 2016 (3 pages).
(Continued)

*Primary Examiner* — Jonathan P Masinick
(74) *Attorney, Agent, or Firm* — Crowell & Moring LLP

(57) ABSTRACT

A component connection includes a first component, which is made of a material attractable by a magnet, and a second component which lies directly or indirectly adjacent to the first component and which has a hole. A magnetic element is provided which covers the hole and attracts the first component such that both components are clamped together.

20 Claims, 1 Drawing Sheet

(51) Int. Cl.
*F16B 5/08* (2006.01)
*H01F 7/02* (2006.01)
*B23K 26/323* (2014.01)
*B23K 26/22* (2006.01)
*B23K 26/08* (2014.01)
*B23K 103/18* (2006.01)
*B23K 103/00* (2006.01)
*F16B 1/00* (2006.01)
*B23K 103/04* (2006.01)
*B23K 101/18* (2006.01)

(52) U.S. Cl.
CPC .......... *B23K 26/323* (2015.10); *B23K 26/324* (2013.01); *F16B 5/08* (2013.01); *H01F 7/0252* (2013.01); *B23K 2101/185* (2018.08); *B23K 2103/04* (2018.08); *B23K 2103/18* (2018.08); *B23K 2103/42* (2018.08); *F16B 2001/0035* (2013.01)

(58) Field of Classification Search
CPC ............ B23K 2101/18; B23K 37/0288; B23K 37/04; B23K 26/323; B23K 26/324; B23K 26/0084; B23K 2103/42; B23K 2103/04
See application file for complete search history.

(56) References Cited

U.S. PATENT DOCUMENTS

| | | | |
|---|---|---|---|
| 6,291,792 B1* | 9/2001 | Fussnegger | B23K 11/20 219/118 |
| 9,039,318 B2* | 5/2015 | Mantei | B23K 31/02 403/361 |
| 9,050,690 B2* | 6/2015 | Hammer | B23K 37/04 |
| 9,222,500 B2* | 12/2015 | Herzinger | B23K 37/0408 |
| 9,296,923 B2* | 3/2016 | Herzinger | B62D 27/026 |
| 9,631,655 B2* | 4/2017 | Van Niekerk | F16B 21/07 |
| 9,751,282 B2* | 9/2017 | Van Niekerk | B32B 7/08 |
| 2011/0173797 A1 | 7/2011 | van Niekerk et al. | |
| 2013/0125372 A1 | 5/2013 | van Niekerk et al. | |
| 2013/0185916 A1 | 7/2013 | Mantei et al. | |
| 2013/0212858 A1 | 8/2013 | Herzinger et al. | |
| 2013/0269873 A1 | 10/2013 | Herzinger et al. | |
| 2014/0201959 A1 | 7/2014 | Van Niekerk et al. | |
| 2016/0256958 A1* | 9/2016 | Van Niekerk | B23K 26/26 |
| 2016/0265568 A1* | 9/2016 | Hammer | F16B 5/065 |
| 2016/0298666 A1* | 10/2016 | Van Niekerk | F16B 5/08 |
| 2017/0023039 A1* | 1/2017 | Van Niekerk | F16B 5/0642 |
| 2017/0095970 A1* | 4/2017 | Stefanziosa | B29C 65/72 |
| 2017/0114816 A1* | 4/2017 | Schulz | F16B 2/04 |
| 2017/0138381 A1* | 5/2017 | Hammer | F16B 5/0096 |
| 2017/0159694 A1* | 6/2017 | Hammer | F16B 35/06 |
| 2018/0015677 A1* | 1/2018 | Stefanziosa | B29C 65/08 |

FOREIGN PATENT DOCUMENTS

| | | |
|---|---|---|
| CN | 103261005 A | 8/2013 |
| CN | 103445657 A | 12/2013 |
| DE | 1 904 297 | 11/1964 |
| DE | 28 41 802 A1 | 4/1979 |
| DE | 83 05 329 U1 | 10/1983 |
| DE | 20 2004 007 458 U1 | 8/2004 |
| DE | 10 2009 049 602 B3 | 7/2011 |
| DE | 10 2010 030 964 A1 | 1/2012 |
| DE | 10 2011 079 483 A1 | 1/2013 |
| DE | 10 2012 214 682 B3 | 10/2013 |
| JP | 5108135 B1 | 12/2012 |
| WO | WO 2012/031652 A1 | 3/2012 |
| WO | WO 2013/131293 A1 | 9/2013 |

OTHER PUBLICATIONS

International Search Report (PCT/ISA/210) issued in PCT Application No. PCT/EP2015/0533595 dated May 6, 2015 with English translation (6 pages).
German-language Written Opinion (PCT/ISA/237) issued in PCT Application No. PCT/EP2015/0533595 dated May 6, 2015 (5 pages).
Chinese-language Office Action issued in counterpart Chinese Application No. 201580003514.5 dated Sep. 12, 2017 with English translation (fourteen (14) pages).
Chinese-language Office Action issued in counterpart Chinese Application No. 201580003514.5 dated Feb. 27, 2017 with English translation (Eighteen (18) pages).

* cited by examiner

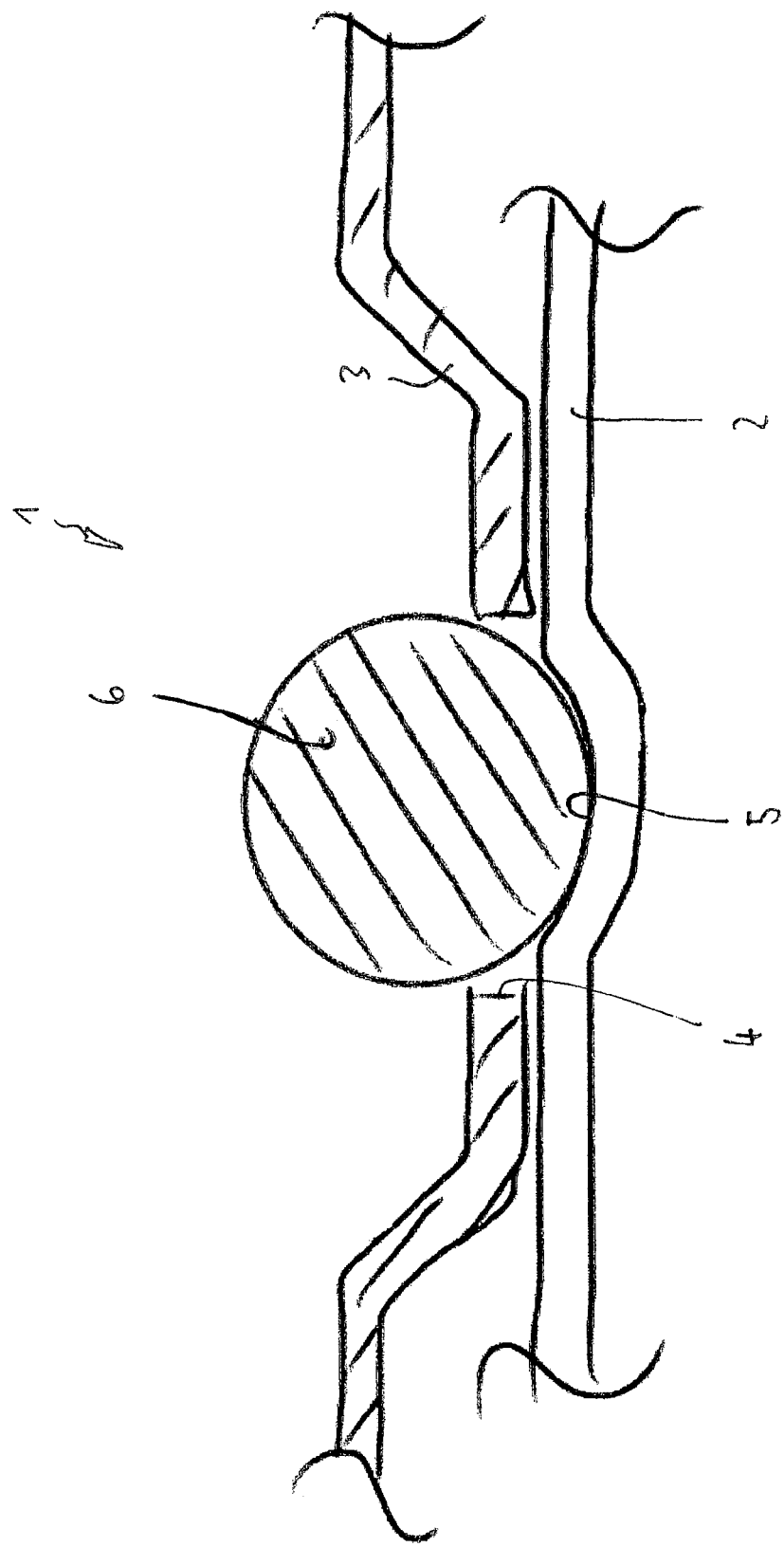

COMPONENT CONNECTION AND METHOD FOR PRODUCING A COMPONENT CONNECTION

CROSS REFERENCE TO RELATED APPLICATIONS

This application is a continuation of PCT International Application No. PCT/EP2015/053595, filed Feb. 20, 2015, which claims priority under 35 U.S.C. § 119 from German Patent Application No. 10 2014 205 609.8, filed Mar. 26, 2014, the entire disclosures of which are herein expressly incorporated by reference.

BACKGROUND AND SUMMARY OF THE INVENTION

The present invention relates to a component connection and to a method for producing a component connection.

It is already known to connect components to one another by means of "ball clamping connections". In this context, reference should be made by way of example to DE 10 2009 049 602 B3, DE 10 2010 030 964 A1, WO 2012 031 652 A1 or DE 10 2012 214 682 B3.

It is an object of the invention to provide a component connection which can be produced in a very simple and cost-effective manner, and to provide a corresponding method.

This and other objects are achieved by a component connection, comprising a first component which is composed of a material which can be attracted by a magnet; a second component which bears indirectly or directly against the first component and has a hole, wherein a magnetic element projects over the hole and attracts the first component such that the two components are clamped together. These objects are also achieved by a method for producing a component connection between a first component which is composed of a material which can be attracted by a magnet, and a second component having a hole, wherein the two components are positioned in such a manner that they bear indirectly or directly against each other, and a magnetic element is provided which projects over the hole and attracts the first component, as a result of which the two components are clamped together.

A starting point of the invention is a component connection comprising a first component and a second component which bears indirectly or directly against the first component and has a hole. The two components are clamped together. The first component is composed of a material which can be attracted by a magnet. As already indicated, the two components do not have to bear directly against each other. On the contrary, a single-layered or multi-layered intermediate layer can also be provided between the two components, or an intermediate part, such as, for example, an intermediate sheet, or the like can also be provided between the two components. The first component may be, for example, a steel sheet.

An aspect of the invention consists in the two components being clamped together by use of a magnetic element. The magnetic element projects over the hole provided in the second component and attracts the first component.

The magnetic element can be entirely or partially in the shape of a ball. For example, the magnetic element can be produced from steel. Steel balls are extremely favorable as mass produced products and can be magnetized in a simple manner.

The hole provided in the second component may be of circular design. However, this does not absolutely have to be the case. The hole could also be triangular, square or polygonal in another manner or else configured as an elongated hole. It is essential that the clear width or the diameter of the hole is smaller than the diameter of the ball, i.e. that it is ensured that the ball or the magnetic element cannot be passed through the hole.

The magnetic element preferably projects at least for a distance into the hole. As a result, a form-fitting connection is produced between the magnetic element and the second component. The magnetic element preferably projects at most into the hole provided in the second component to an extent such that the two components are still just clamped together, that is to say that the magnetic element at most bears "lightly" against the first component such that the two components cannot lift off each other.

According to a development of the invention, the first component has a "centering element" against which a portion of the magnetic element bears, the portion projecting through the hole, wherein the magnetic element is centered in a defined position with respect to the first component by the centering element. By this means, it is therefore ensured that the magnetic element produces a form-fitting connection between the two components or that there is a (certain) form-fitting connection between the magnetic element and each of the two components.

The centering element can be formed, for example, by a stamped structure provided in the first component. The stamped structure may be formed, for example, by a trough-like depression. The trough-like depression may be designed, for example, to be circular, elongate, triangular, square or polygonal in another manner.

As an alternative thereto, the centering element can also be formed by a hole which is provided in the first component and into which the magnetic element projects for a distance. It is also essential here that the clear width of the centering element—or, in the case of a hole, the diameter of the hole—is smaller than the clear width or diameter of the magnetic element such that it is ensured that the centering element actually acts in a centering manner with respect to the magnetic element.

The second component may likewise be composed of a material which can be attracted by a magnet. However, this does not necessarily have to be the case. The second component may also be composed, for example, of a non-magnetic material, such as, for example, of plastic.

According to a development of the invention, it can be provided that, in addition to the "magnetic connection", the two components are fixedly connected to each other permanently, for example by screwing, riveting, welding or adhesive bonding.

The invention is not restricted to a component connection, but also includes a method for producing a component connection or a method for connecting a first component which is composed of a material which can be attracted by a magnet, to a second component having a hole.

The method according to the invention consists in that the two components are positioned in such a manner that they bear indirectly or directly against each other and that a magnetic element is provided which projects over the hole and attracts the first component, wherein the two components are clamped together.

After the two components are clamped together, the magnetic element can be welded to the first component, as a result of which a nonreleasable form-fitting connection is produced between the two components.

If the second component is composed of a weldable material, the second component can also be welded to the magnetic element. Alternatively or additionally thereto, the two components may also be welded directly to each other.

If the magnetic element is a magnetic ball, a smooth weld seam can be produced that extends around the entire magnetic ball and via which the magnetic ball and the first component and/or the magnetic ball and the second component are welded to each other.

The welding can take place, for example, contactlessly by use of a laser welding device. The laser welding device can be guided here by a robot. If the magnetic element is a magnetic ball, the position of the ball can be determined in a very simple manner optoelectronically by way of a position detection device. The position data determined by the detection device (for example a center point of the ball) can be supplied to a robot guiding the welding device and used for controlling the welding robot.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIGURE, FIG. 1, shows the basic principle of the invention in a schematic illustration.

DETAILED DESCRIPTION OF THE DRAWINGS

FIG. 1 shows a component connection 1 which has a first component 2 and a second component 3. A passage hole 4 is provided in the second component 3.

The first component 2 has a trough-like depression 5 which acts as a centering element for a magnetic ball 6. The first component 2 is composed of a material which is attracted by the magnetic ball 6.

As is apparent from FIG. 1, the clear width of the through hole 4 provided in the second component 3 is at least somewhat smaller than the clear width or the diameter of the magnetic element formed by the magnetic ball 6. The magnetic ball 6 therefore projects at least for a distance over the through hole provided in the second component 3. Since the magnetic ball 6 attracts the first component 2, a clamping connection is produced between the two components 2, 3.

As is apparent from FIG. 1, the magnetic ball 6 bears, at least in a contact point region, against the upper side of the trough-like depression 5 which is provided in the first component 2. Owing to the magnetic attraction between the magnetic ball 6 and the first component 2 and the fact that the magnetic ball 6 at least partially projects over the through hole 4, the two components 2, 3 are "centered" relative to each other by the magnetic ball 6.

With a magnetic ball of this type, components can be fixed relative to one another in a very simple and cost-effective manner. Component connections of this type can be used in a versatile manner, for example in the manufacturing of vehicle bodies, in the region of white goods, etc. The two components 2, 3 may therefore be, in particular, vehicle body components. Of course, it is also possible for only one of the two components 2, 3 to be a body component of a vehicle, and the other component may be an accessory part or an accessory component.

After the two components 2, 3 are clamped together by the magnetic force exerted by the magnetic ball 6, the two components 2, 3 can be fixedly connected to each other permanently, for example by screwing, riveting, adhesive bonding, welding or in another manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
    a first component composed of a material that is attracted by a magnet;
    a second component that bears directly or indirectly against the first component and includes a hole;
    a magnetic element,
    wherein
        the hole in the second component has a clear width less than a clear width or a diameter of the magnetic element,
        the magnetic element projects over the hole and magnetically attracts the first component from a side of the second component opposite a side facing the first component, and
        the first and second components are clamped together by the magnetic attraction between the magnetic element and the first component.

2. The component connection according to claim 1, wherein the magnetic element has at least partially a ball shape.

3. The component connection according to claim 2, wherein the magnetic element is composed of steel.

4. The component connection according to claim 1, wherein:
    the hole is a circular hole.

5. The component connection according to claim 1, wherein:
    the first component comprises a centering element against which a portion of the magnetic element bears, and
    the portion of the magnetic element projects through the hole, as a result of which the magnetic element is centered by the centering element in a defined position with respect to the first component.

6. The component connection according to claim 5, wherein the centering element is a stamped structure provided in the first component.

7. The component connection according to claim 6, wherein the stamped structure is configured as a trough-shaped depression provided in the first component.

8. The component connection according to claim 5, wherein the centering element is a hole provided in the first component.

9. The component connection according to claim 8, wherein the hole in the first component has a clear width that is less than a clear width or a diameter of the magnetic element.

10. The component connection according to claim 1, wherein the second component is a plastics component.

11. The component connection according to claim 1, wherein the first and second components are adhesively bonded to one another via an adhesive layer situated between the first and second components.

12. A method for producing a component connection between a first component composed of a material attracted by a magnet and a second component having a hole, the method comprising the acts of:

positioning the first and second components so as to bear directly or indirectly against one another; and providing a magnetic element which projects over the hole of the second component and magnetically attracts the first component, as a result of which the first and second components are clamped together by the magnetic attraction between the magnetic element and the first component, wherein the hole in the second component has a clear width less than a clear width or a diameter of the magnetic element, and the magnetic element projects over the hole and magnetically attracts the first component from a side of the second component opposite a side facing the first component.

13. The method according to claim 12, further comprising the act of:

after clamping the first and second components together, welding the magnetic element to the first component.

14. The method according to claim 13, wherein the first and second components are composed of metal and the method further comprises the act of welding the magnetic element to the second component.

15. The method according to claim 14, wherein the act of welding the magnetic element to the first component is carried out by contactless laser welding via a laser welding device guided in an electronically controlled manner by a robot.

16. The method according to claim 15, further comprising the acts of:

determining, via a position detection device, a position of the magnetic element; and supplying position data of the position of the magnetic element to the robot electronically controlling the laser welding device, wherein the robot controls the laser welding device using the position data of the magnetic element.

17. The method according to claim 13, wherein the act of welding the magnetic element to the first component is carried out by contactless laser welding via a laser welding device guided in an electronically controlled manner by a robot.

18. The method according to claim 17, further comprising the acts of:

determining, via a position detection device, a position of the magnetic element; and supplying position data of the position of the magnetic element to the robot electronically controlling the laser welding device, wherein the robot controls the laser welding device using the position data of the magnetic element.

19. The method according to claim 18, wherein the position of the magnetic element is a center point of a ball forming the magnetic element.

20. The method according to claim 12, wherein the first and second components are composed of metal and the method further comprises the act of welding the magnetic element to the second component.

* * * * *